United States Patent
Miyazaki

(10) Patent No.: US 7,808,678 B2
(45) Date of Patent: Oct. 5, 2010

(54) IMAGE PROCESSING DEVICE, IMAGE OUTPUT DEVICE, TERMINAL DEVICE, IMAGE FORMING SYSTEM, COMPUTER READABLE MEDIUM STORING PROGRAM THEREOF AND IMAGE PROCESSING METHOD

(75) Inventor: Koichi Miyazaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 630 days.

(21) Appl. No.: 11/819,088

(22) Filed: Jun. 25, 2007

(65) Prior Publication Data

US 2008/0158610 A1 Jul. 3, 2008

(30) Foreign Application Priority Data

Dec. 28, 2006 (JP) ............... 2006-354367

(51) Int. Cl.
*H04N 1/40* (2006.01)
(52) U.S. Cl. ....................... 358/3.01; 358/1.9
(58) Field of Classification Search .............. 358/1.9
See application file for complete search history.

(56) References Cited

U.S. PATENT DOCUMENTS

| 5,283,664 | A | 2/1994 | Fujisawa et al. |
| 5,699,169 | A | 12/1997 | Nakatani et al. |
| 6,057,932 | A * | 5/2000 | Yoshida et al. ............... 358/1.9 |
| 2004/0004644 | A1 | 1/2004 | Komatsu et al. |
| 2007/0106962 | A1 | 5/2007 | Sakakibara et al. |

FOREIGN PATENT DOCUMENTS

| EP | 1 784 003 A1 | 5/2007 |
| JP | A-03-092079 | 4/1991 |
| JP | A 2003-312061 | 11/2003 |
| JP | A-2005-035012 | 2/2005 |
| JP | A-2005-161580 | 6/2005 |

OTHER PUBLICATIONS

Oct. 7, 2009 Office Action issued in European Patent Application No. 07 111 553.9.

* cited by examiner

*Primary Examiner*—Twyler L Haskins
*Assistant Examiner*—Michael Burleson
(74) *Attorney, Agent, or Firm*—Oliff & Berridge, PLC

(57) ABSTRACT

An image processing device includes a multivalue-converting unit that converts input binary image data including plural color components into multivalued image data; a restriction unit that restricts imaging materials to be used for multivalued image data produced by the multivalue-converting unit; and a binarizing unit that binarizes the multivalued image data for which the imaging materials to be used have been restricted by the restriction unit.

19 Claims, 8 Drawing Sheets

IMAGE PROCESSING DEVICE, IMAGE OUTPUT DEVICE, TERMINAL DEVICE, IMAGE FORMING SYSTEM, COMPUTER READABLE MEDIUM STORING PROGRAM THEREOF AND IMAGE PROCESSING METHOD

CROSS-REFERENCE TO RELATED APPLICATIONS

This application is based on and claims priority under 35 USC 119 from Japanese Patent Application No. 2006-354367 filed Dec. 28, 2006.

BACKGROUND

1. Technical Field

The present invention relates to an image processing device, an image output device, a terminal device, an image forming system, a computer readable medium storing a program thereof and an image processing method.

2. Related Art

There is disclosed an image forming apparatus provided with a mechanism of restricting a total of quantities of toners to be used for a multivalued image having plural color components.

SUMMARY

An aspect of the present invention resides in an image processing device including a multivalue-converting unit that converts input binary image data having plural color components into multivalued image data, a restriction unit that restricts imaging materials to be used for multivalued image data produced by the multivalue-converting unit, and a binarizing unit that binarizes the multivalued image data for which the imaging materials to be used have been restricted by the restriction unit.

BRIEF DESCRIPTION OF THE DRAWINGS

Exemplary embodiments of the present invention will be described in detail based on the following figures, wherein.

DETAILED DESCRIPTION

Exemplary embodiments of the present invention will now be described in detail with reference to the drawings.

First Exemplary Embodiment

Figure 1:
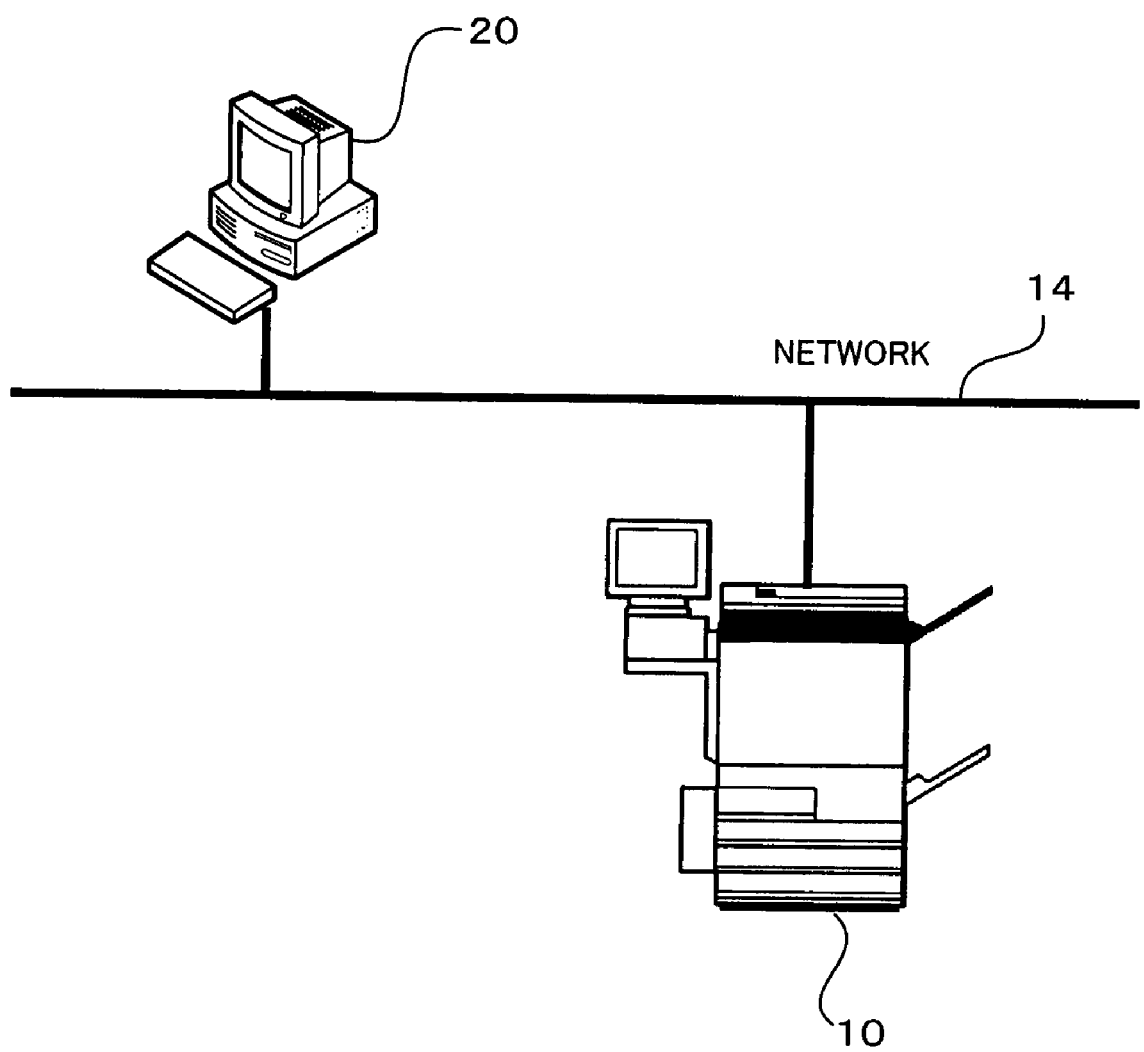
FIG. 1 is a diagram showing a schematic of an image forming system including an image forming apparatus 10 according to a first exemplary embodiment of the present invention.

FIG. 1 is a diagram showing a schematic of an image forming system including an image forming apparatus 10 according to a first exemplary embodiment of the present invention.

As shown in FIG. 1, the image forming system includes the image forming apparatus 10 and a terminal device 20 which are connected via a network 14. The terminal device 20 generates printing data such as printing jobs and transmits, to the image forming apparatus 10, image data which will later be processed so that the use amount of an imaging material is restricted. The image forming apparatus 10 receives the printing data transmitted from the terminal device 20 and outputs an image corresponding to the printing data on printing paper.

Figure 2:
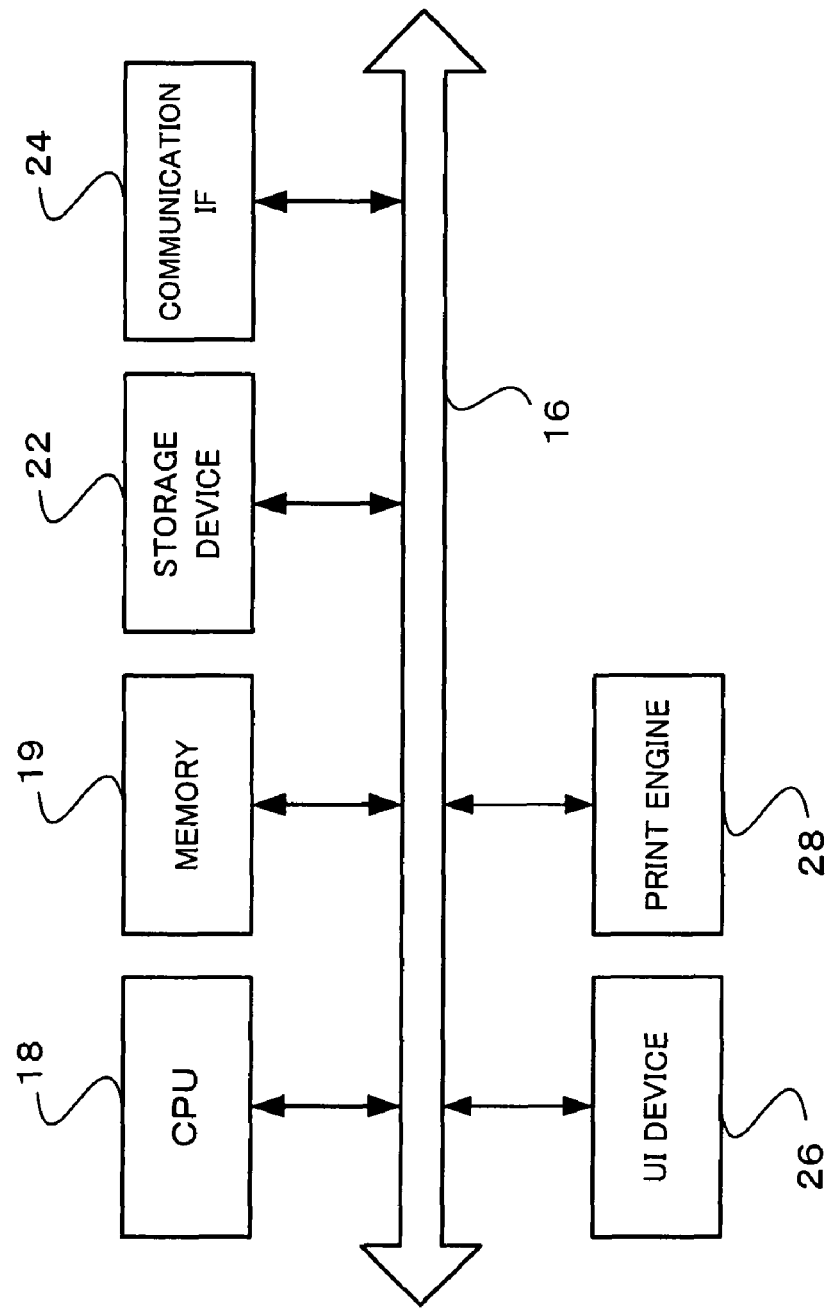
FIG. 2 is a diagram showing a hardware structure of the image forming apparatus 10 according to the first exemplary embodiment of the present invention.

Next, a hardware structure of the image forming apparatus 10 of the present exemplary embodiment is shown in FIG. 2.

The image forming apparatus 10, as shown in FIG. 2, includes a CPU 18, a memory 19, a storage device 22 such as a hard disk drive (HDD), a communication interface (IF) 24 which transmits and receives data to/from an external computer or the like via the network 14, a user interface (UI) device 26 including a tough panel or a liquid crystal display and a keyboard, and a print engine 28. These components are interconnected via a control bus 16.

The CPU 18 performs prejudged processes based on an image processing program embodied in a computer readable medium and stored in the memory 19 or the storage device 22 and controls the operation of the image forming apparatus 10. The image processing program may be distributed from an external source via the communication interface IF 24 or stored in a storage medium such as a CD-ROM and distributed.

Figure 3:
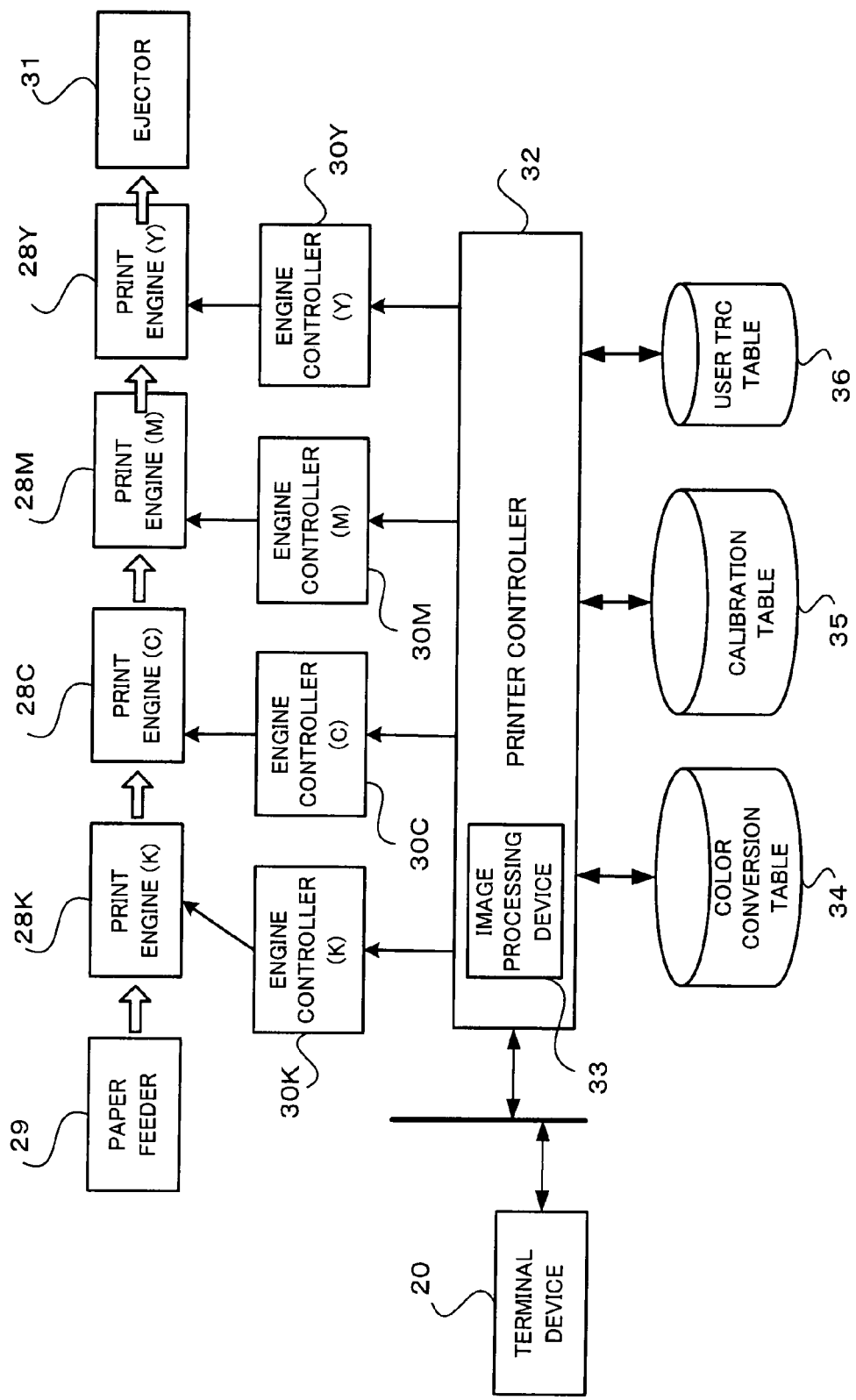
FIG. 3 is a block diagram showing an arrangement of functions of the image forming apparatus 10 according to the first exemplary embodiment of the present invention.

FIG. 3 is a block diagram showing an arrangement of functions of the image forming apparatus 10 and these functions are realized by the execution of the above image processing program.

The image forming apparatus 10 of the present exemplary embodiment, as shown in FIG. 3, is equipped with a paper feeder 29, print engines 28K to 28Y, engine controllers 30K to 30Y, an ejector 31, a printer controller 32, a color conversion table 34, a calibration table 35, and a user TRC (Tone Reproduction Curve) table 36. Within the printer controller 32, an image processing device 33 for image processing on image data to be printed is configured.

The color conversion table 34 stores data for color conversion such as LUT (Look Up Table) in which data corresponding to each of all combinations of CMYK color data is set.

The calibration table 35 stores tone correction data for correcting an input image signal so that an output result of the image output device will match a target density.

The user TRC table 36 stores data for tone characteristic correction depending on printing paper type and other conditions.

The engine controllers 30K to 30Y respectively control the operations of the print engines 28K to 28Y. The print engines 28K to 28Y respectively perform printing based on printing data for each color of YMCK on printing paper fed from the paper feeder 29 and output the print result to the ejector 31. The print engines 28K to 28Y function as image output devices that output an image based on image data having color data converted by the image processing device 33.

Next, the configuration of the image processing 7 device 33 in FIG. 3 is described with reference to FIG. 4.

Figure 4:
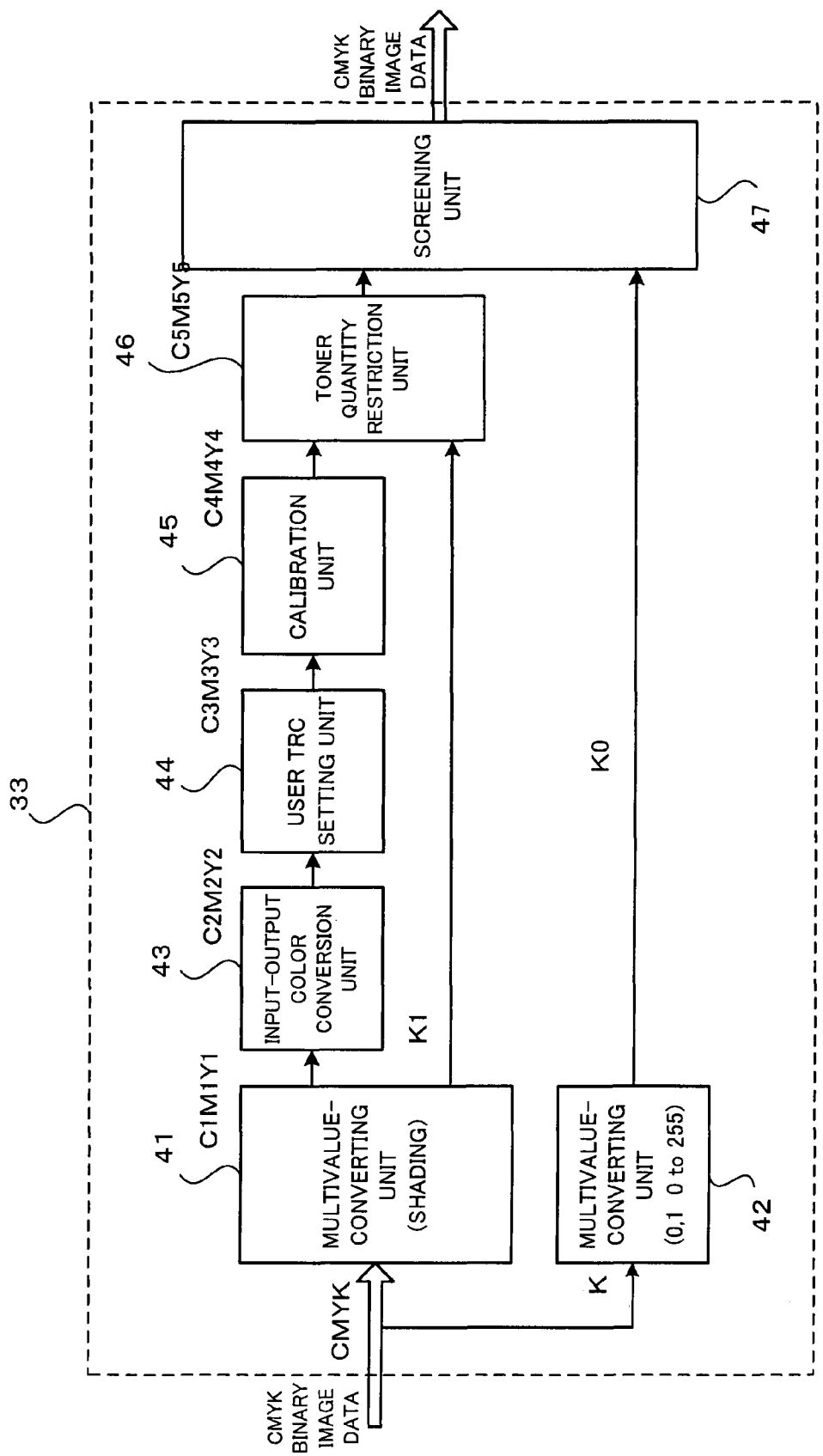
FIG. 4 is a block diagram showing a configuration of an image processing device 33 in FIG. 3.

The image processing device 33 in the present exemplary embodiment, as shown in FIG. 4, is provided with multivalue-converting units 41, 42, an input-output color conversion unit 43, a user TRC (Tone Reproduction Curve) setting unit 44, a calibration unit 45, a toner quantity restriction unit 46, and a screening unit 47.

Multivalue-converting unit 41 converts the input CMYK binary image data (binary image data) into multivalued image data. Here, as a concrete example of multivalue-converting, shading or the like using a space filter is possible. In this case, the space filter should be set to shade the image to an extent that the tone characteristic of the image can be restored.

Multivalue-converting unit 42 converts the K color (black) image data out of input CMYK binary image data into multivalued image data (KO). Unlike the multivalue-converting unit 41, here, the multivalue-converting unit 42 converts binary data of 0 and 1 into multivalued image data without performing shading or the like. In particular, if multivalued image data uses eight bits for each color to represent a tone, the multivalue-converting unit 42 converts binary data of 0 and 1 into multivalued image data of 0 to 255.

The input-output color conversion unit 43 performs color conversion of CMY components (C1M1Y1) of multivalued image data produced by the multivalue-converting unit 41, according to the color conversion table 34.

The user TRC setting unit 44 corrects tone values of color-converted image data (C2M2Y2) produced by the input-output color conversion unit 43, according to a user-specified tone correction curve among those curves stored in the user TRC table 36.

The calibration unit 45 calibrates tone-corrected image data (C3M3Y3) produced by the user TRC setting unit 44, according to the calibration table 35. Here, the calibration is to perform tone correction for the purpose of compensating for effects of environmental changes and temporal changes in the image output device.

The toner quantity restriction unit 46 restricts the quantities of toners to be used for calibrated image data (C4M4Y4) produced by the calibration unit 45. In particular, the toner quantity restriction unit 46 restricts the quantities of toners by restricting the sum of signal levels corresponding to each of the CMY color components of image data (C4M4Y4) within a given area, for example, within a pixel area, up to a certain value.

The method of restricting the quantities of toners by the toner quantity restriction unit 46 is explained with reference to FIG. 5.

Figure 5:
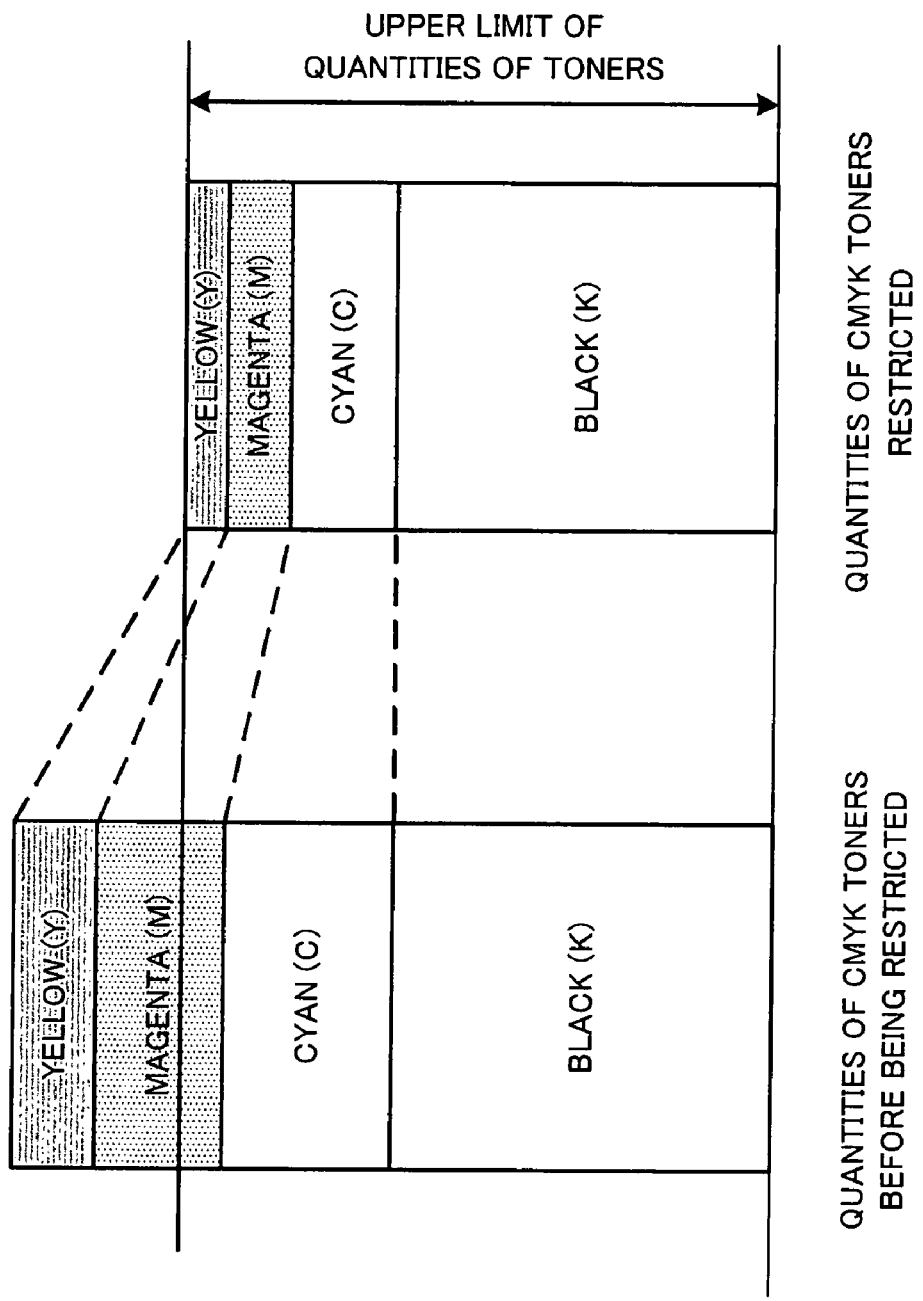
FIG. 5 illustrates a method of restricting the quantities of toners by a toner quantity restriction unit 46.

As shown in FIG. 5, if a total area fill ratio of CMYK toners exceeds a predetermined upper limit, the toner quantity restriction unit 46 reduces the CMY values by a constant factor so that the area fill ratio of the CMYK toners falls within the upper limit. In this way, the quantities of the toners are restricted. According to this manner of restricting the quantities of the toners, the hue is preserved because the proportions of cyan (C), magenta (M), and yellow (Y) values remain the same before and after the restriction of the quantities of the toners is applied. The toner quantity restriction unit 46 may be configured to restrict the quantities of the toners by reducing the values of the CMYK colors by different factors.

Here, the area fill ratio denotes the sum of the quantities of the CMYK toners, if a maximum quantity of one color toner is 100%. That is, if four CMYK color toners are used, a maximum area fill ratio is 400% (=four colors×100%).

The toner quantity restriction unit 46 determines whether the quantities of the toners exceed the upper limit, using multivalued image data for the K component (K1) produced by the multivalue-converting unit 41 and calibrated multivalued image data for the CMY components (C4M4Y4) produced by the calibration unit 45, but restricts only the signal levels of the CMY components without restricting the K color signal level.

The screening unit 47 binarizes image data for the CMY components (C5M5Y5) that is multivalued image data for which the quantities of toners to be used have been restricted by the toner quantity restriction unit 46 and multivalued image data for the K color (K0) produced by the multivalue-converting unit 42, thus converting the multivalued image data into CMYK binary image data.

The CMYK binary image data produced by the screening unit 47 is distributed to the engine controllers 30K to 30Y shown in FIG. 3 and an image is formed from this data.

In the toner quantity restriction unit 46, the image data for the K color (K1) is used only for determining whether the quantities of the toners exceed the limit. The image data (K0) produced by the multivalue-converting unit 42 is used as the K color component in actual printing data. The reason why the image data for the K color is not subjected to multivalue-converting with shading is to avoid blurring of black characters.

The screening unit 47 prevents generation of Moire (interference fringes) by error diffusion, if image data input to the image processing device 33 is binary image data.

Figure 6:
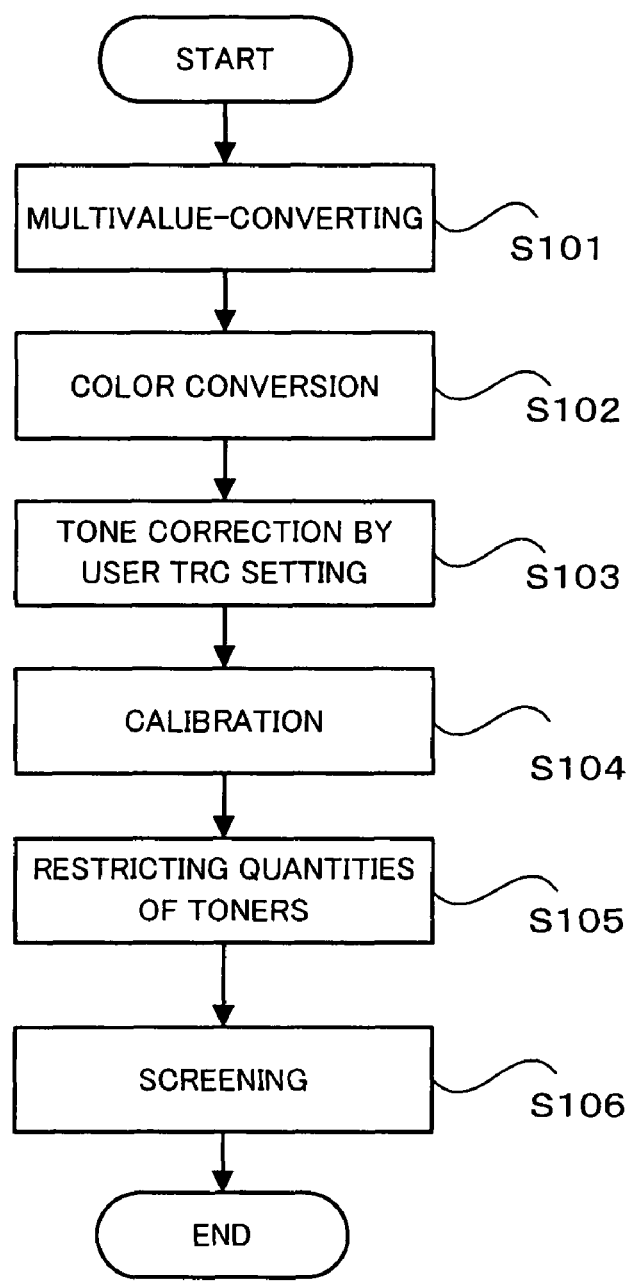
FIG. 6 is a flowchart illustrating the operation of the image processing device 33 according to the first exemplary embodiment of the present invention.

Next, the operation of the image processing device 33 of the present exemplary embodiment is described in detail with reference to a flowchart of FIG. 6.

First, when CMYK binary image data is input, its CMYK components are converted into multivalued image data (C1M1Y1K1) in the multivalue-converting unit 41 and its K component is converted into multivalued image data (K0) in the multivalue-converting unit 42 (S101).

The image data for CMY components (C1M1Y1) of the multivalued image data produced by the multivalue-converting unit 41 is color-converted (S102) by the input-output color conversion unit 43, subjected to tone correction by user TRC (S103) in the user TRC setting unit 44, and calibrated (S104) by the calibration unit 45.

Then, the toner quantity restriction unit 46 determines whether the quantities of toners to be used exceed the upper limit, using multivalued image data for the K component (K1) produced by the multivalue-converting unit 41 and calibrated multivalued image data for the CMY components (C4M4Y4) produced by the calibration unit 45 and restricts the quantities of the toners by restricting the signal levels of the CMY components (S105).

Finally, the screening unit 47 binarizes multivalued image data for the K color (K0) produced by the multivalue-converting unit 42 and the image data for the CMY color components (C5M5Y5), that is, the multivalued image data for which the quantities of the toners to be used have been restricted by the toner quantity restriction unit 46, thus producing CMYK binary image data (S106).

In the present exemplary embodiment, after multivalued image data (C1M1Y1) produced by the multivalue-converting unit 41 is subjected to color conversion and other processing steps performed by the input-output color conversion unit 43, the user TRC setting unit 44, and the calibration unit 45, the quantities of toners to be used for the multivalued image are restricted by the toner quantity restriction unit 46. However, the input-output color conversion unit 43, the user TRC setting unit 44, and the calibration unit 45 are not indispensable. Thus, the multivalued image data (C1M1Y1) produced by the multivalue-converting unit 41 may be directly supplied to and processed by the toner quantity restriction unit 46 so that the quantities of toners to be used for the multivalued image are restricted without being passed through the input-output color conversion unit 43, the user TRC setting unit 44, and the calibration unit 45.

Because, mostly, characters are printed or imaged in black, image data for the black (K) color is separately converted into multivalued image data by the multivalue-converting unit 42 as image data for a specific color in the present exemplary embodiment. However, if it is advisable to avoid degradation of image quality in a color other than black (K), one of other colors, cyan (C), magenta (M), and yellow (Y) may be separately processed as a specific color.

Furthermore, if degradation of image quality of image data for the black (K) color becomes no problem, all CMYK colors may be treated equally, converted into multivalued image data by the multivalue-converting unit 41, and processed by the toner quantity restriction unit 46 so that the quantities of toners to be used for the multivalued image are restricted.

Second Exemplary Embodiment

Next, an image forming apparatus according to a second exemplary embodiment of the present invention is described.

In the above-described first exemplary embodiment, a situation is assumed where input image data is CMYK binary image data. Differently from the above situation, the second exemplary embodiment is adapted to be capable of restricting the quantities of toners even in a situation where input image data is not only CMYK binary image data but also RGB binary image data.

Figure 7:
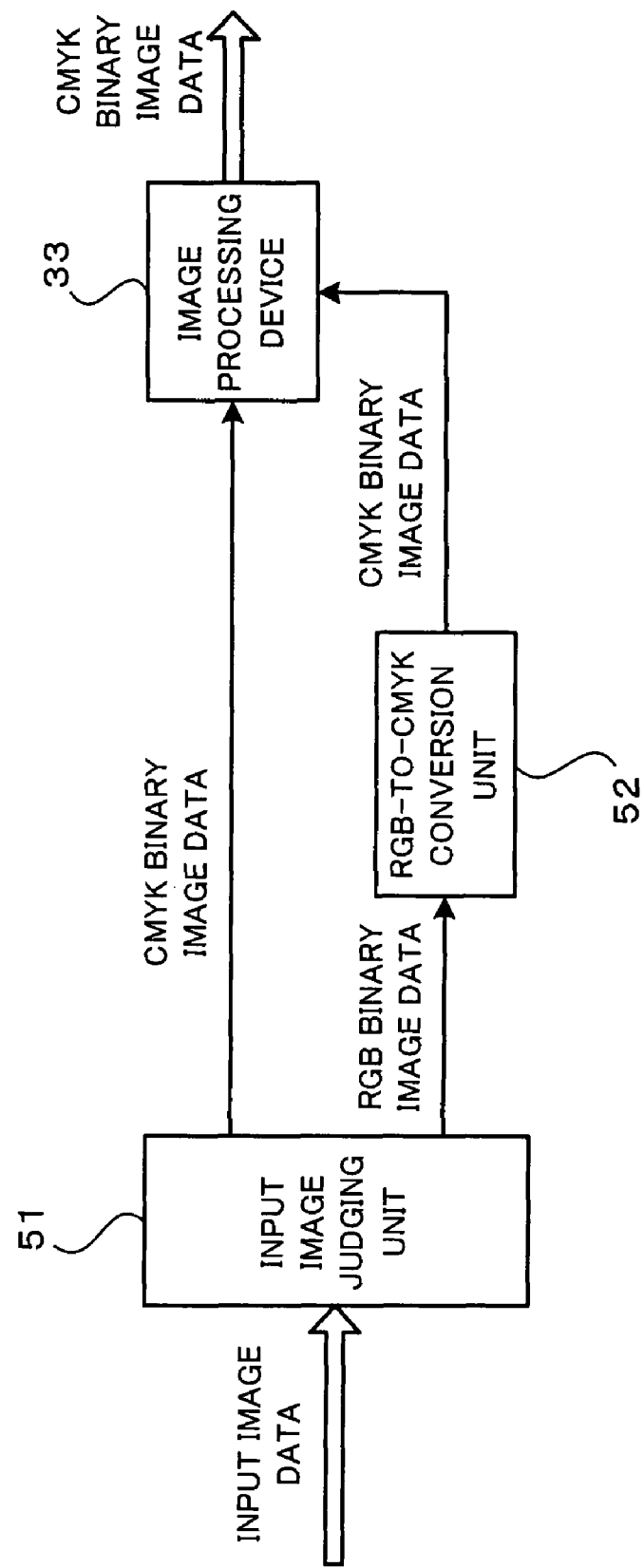
FIG. 7 is a block diagram showing a configuration of an image processing device according to a second exemplary embodiment of the present invention.

The configuration of an image processing device in the present exemplary embodiment is shown in FIG. 7. The image processing device in the present exemplary embodiment, as shown in FIG. 7, is composed of an input image judging unit 51, an RGB-to-CMYK conversion unit 52, and the image processing device 33.

The image processing device 33 is configured the same as the image processing device 33 in the first exemplary embodiment shown in FIG. 4 and, therefore, the description thereof is not repeated.

The input image judging unit 51 judges whether input image data is RGB image data or CMYK image data or judges the type of the input image data such as multivalued image data or binary image data.

If input image data is CMYK multivalued image data or RGB multivalued image data, the image data is processed in the same way as before; therefore, a description thereof is not given herein.

The RGB-to-CMYK conversion unit 52 converts RGB binary image data, as judged so by the input image judging unit 51, into CMYK binary image data. Conversion that is performed by the RGB-to-CMYK conversion unit 52 is explained with reference to FIG. 8.

Figure 8:
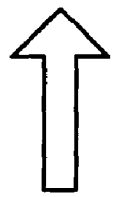
FIG. 8 illustrates conversion by an RGB-to-CMYK conversion unit 52.

The RGB-to-CMYK conversion unit 52 converts each individual piece of RGB data of input RGB image data in such a manner as illustrated in FIG. 8 into CMYK binary image data.

The image processing device 33 shown in FIG. 7 processes CMYK binary image data, as judged so by the input image judging unit 51, to restrict the quantities of toners to be used for the CMYK image data. The image processing device 33 also processes CMYK binary image data output by the RGB-to-CMYK conversion unit 52 to restrict the quantities of toners to be used for the CMYK image.

In this way, if input image data is RGB binary image data, after it is converted into CMYK binary image data by the RGB-to-CMYK conversion unit 52, the CMYK binary image data is processed by the image processing device 33 so that the quantities of toners to be used for the CMYK image are restricted.

Here, referring to FIG. 8, there is no set of CMYK bits with more than two bits being on in output CMYK image data regardless of combinations of RGB data. Thus, if the upper limit of the quantities of toners in the image output device is 200% or higher, it is not necessary to process RGB binary image data to restrict the quantities of toners. However, if the upper limit of the quantities of toners in the image output device is less than 200%, e.g., 180%, it is necessary to restrict the quantities of toners by use of the configuration shown in FIG. 7.

[Modification]

While the foregoing exemplary embodiments illustrate the invention embodied in the image forming apparatus that uses toners as coloring materials like laser printers, the present invention can be applied in the same way to other image forming apparatus that uses inks or the like as coloring materials.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image processing device comprising:
    a multivalue-converting unit that converts input binary image data including a plurality of color components into multivalued image data;
    a restriction unit that restricts imaging materials to be used for multivalued image data produced by the multivalue-converting unit; and
    a binarizing unit that binarizes the multivalued image data for which the imaging materials to be used have been restricted by the restriction unit,
    wherein the multivalue-converting unit includes a first multivalue-converting unit that converts the binary image data for a specific color component into multivalued image data and a second multivalue-converting unit that converts the binary image data for color components other than the specific color component into multivalued image data, and
    the restriction unit restricts the quantities of the imaging materials to be used for multivalued image data produced by the second multivalue-converting 2. The image processing device according to claim 1, further comprising a color conversion unit that performs color conversion of the multivalued image data produced by the multivalue-converting unit,
    wherein the restriction unit restricts the quantities of the imaging materials to be used for the color-converted multivalued image data.

3. The image processing device according to claim 1, further comprising a color correction unit that performs color correction of the multivalued image data produced by the multivalue-converting unit, wherein the restriction unit restricts the quantities of the imaging materials to be used for the color-corrected multivalued image data.

4. The image processing device according to claim 1, wherein the restriction unit restricts the imaging materials by restricting the sum of the color components other than the specific color within a given area of the multivalued image data produced by the second multivalue-converting unit.

5. The image processing device according to claim 4, wherein the plurality of color components are four colors of cyan, magenta, yellow, and black; and
the specific color component is one color of black.

6. An image forming system comprising:
an image processing device including a multivalue-converting unit that converts input binary image data including a plurality of color components into multivalued image data, a restriction unit that restricts imaging materials to be used for multivalued image data produced by the multivalue-converting unit, and a binarizing unit that binarizes the multivalued image data for which the imaging materials to be used have been restricted by the restriction unit, wherein the multivalue-converting unit includes a first multivalue-converting unit that converts the binary image data for a specific color component into multivalued image data and a second multivalue-converting unit that converts the binary image data for color components other than the specific color component into multivalued image data, and
an image output device that outputs an image based on image data after being processed for imaging materials restriction by the image processing device; and
a terminal device that transmits, to the image processing device, image data before being processed for imaging materials restriction by the image processing device, and
the restriction unit restricts the quantities of the imaging materials to be used for multivalued image data produced by the second multivalue-converting unit.

7. An image forming system comprising:
an input image judging unit that judges a type of input image data;
a conversion unit that converts image data judged by the input image judging unit as binary image data including a plurality of color components in a first color system into binary image data including a plurality of color components in a second color system;
an image processing device comprising a multivalue-converting unit that converts image data judged by the input image judging unit as binary image data in the second color system or image data converted to binary image data in the second color system by the conversion unit into multivalued image data, a restriction unit that restricts imaging materials to be used for multivalued image data produced by the multivalue-converting unit, and a binarizing unit that binarizes the multivalued image data for which the imaging materials to be used have been restricted by the restriction unit, wherein the multivalue-converting unit includes a first multivalue-converting unit that converts the binary image data for a specific color component into multivalued image data and a second multivalue-converting unit that converts the binary image data for color components other than the specific color component into multivalued image data, and
an image output device that outputs an image based on image data after being processed for imaging materials restriction by the image processing device; and
a terminal device that transmits, to the image processing device, image data before being processed for imaging materials restriction by the image processing device, and
the restriction unit restricts the quantities of the imaging materials to be used for multivalued image data produced by the second multivalue-converting unit.

8. The image forming system according to claim 6, wherein the image processing device further comprises a color conversion unit that performs color conversion of the multivalued image data produced by the multivalue-converting unit; and
the restriction unit restricts the quantities of the imaging materials to be used for the color-converted multivalued image data.

9. The image forming system according to claim 6, wherein the image processing device further comprises a color correction unit that performs color correction of the multivalued image data produced by the multivalue-converting unit; and
the restriction unit restricts the quantities of the imaging materials to be used for the color-corrected multivalued image data.

10. The image forming system according claim 6, wherein the restriction unit restricts the imaging materials by restricting the sum of the color components other than the specific color within a given area of the multivalued image data produced by the second multivalue-converting unit.

11. The image forming system according to claim 10, wherein the plurality of color components are four colors of cyan, magenta, yellow, and black; and
the specific color component is one color of black.

12. A terminal device that transmits, to an image processing device, image data before being processed for imaging materials restriction by the image processing device comprising a multivalue-converting unit that converts input binary image data including plurality of color components into multivalued image data, a restriction unit that restricts imaging materials to be used for multivalued image data produced by the multivalue-converting unit, and a binarizing unit that binarizes the multivalued image data for which the imaging materials to be used have been restricted by the restriction unit,
wherein the multivalue-converting unit includes a first multivalue-converting unit that converts the binary image data for a specific color component into multivalued image data and a second multivalue-converting unit that converts the binary image data for color components other than the specific color component into multivalued image data; and
the restriction unit restricts the quantities of the imaging materials to be used for multivalued image data produced by the second multivalue-converting unit.

13. An image output device that outputs an image based on image data after being processed for imaging materials restriction by an image processing device comprising a multivalue-converting unit that converts input binary image data including a plurality of color components into multivalued image data, a restriction unit that restricts imaging materials to be used for multivalued image data produced by the multivalue-converting unit, and a binarizing unit that binarizes the multivalued image data for which the imaging materials to be used have been restricted by the restriction unit,
wherein the multivalue-converting unit includes a first multivalue-converting unit that converts the binary image data for a specific color component into multivalued image data and a second multivalue-converting unit that converts the binary image data for color components other than the specific color component into multivalued image data; and the restriction unit restricts the quantities of the imaging materials to be used for multivalued image data produced by the second multivalue-converting unit.

14. A non-transitory computer readable medium storing a program causing a computer to perform a process comprising:

converting input binary image data including a plurality of color components into multivalued image data;

restricting imaging materials to be used for the multivalued image data; and binarizing the multivalued image data for which the imaging materials to be used have been restricted, wherein the process of converting the binary image data into multivalued image data includes a first process of converting the binary image data for a specific color component into multivalued image data and a second process of converting the binary image data for color components other than the specific color component into multivalued image data, and the process of restricting imaging materials includes restricting the quantities of the imaging materials to be used for multivalued image data produced by the second process of converting.

15. The computer readable medium storing the program according to claim 14, causing the computer to perform the process further comprising performing color conversion of the multivalued image data, and the process of restricting the imaging materials comprises restricting the quantities of the imaging materials to be used for the color-converted multivalued image data.

16. The computer readable medium storing the program according to claim 14, causing the computer to perform the process further comprising performing color correction of the multivalued image data, and the process of restricting imaging materials comprises restricting the quantities of the imaging materials to be used for the color-corrected multivalued image data.

17. The computer readable medium storing the program according to claim 14, wherein the process of restricting imaging materials comprises restricting the imaging materials by restricting the sum of the color components other than the specific color within a given area of the multivalued image data converted by the second process of converting.

18. The computer readable medium storing the program according to claim 17, wherein the plurality of color components are four colors of cyan, magenta, yellow, and black; and the specific color component is one color of black.

19. An image processing method comprising:

converting input binary image data including a plurality of color components into multivalued image data;

restricting imaging materials to be used for multivalued image data; and binarizing the multivalued image data for which the imaging materials to be used have been restricted, wherein the process of converting the binary image data into multivalued image data includes a first process of converting the binary image data for a specific color component into multivalued image data and a second process of converting the binary image data for color components other than the specific color component into multivalued image data, and the process of restricting imaging materials includes restricting the quantities of the imaging materials to be used for multivalued image data produced by the second process of converting.

* * * * *